United States Patent
Takeyama

(10) Patent No.: US 10,807,483 B2
(45) Date of Patent: Oct. 20, 2020

(54) FUEL CELL VEHICLE

(71) Applicant: TOYOTA JIDOSHA KABUSHIKI KAISHA, Toyota-shi, Aichi-ken (JP)

(72) Inventor: Makoto Takeyama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 192 days.

(21) Appl. No.: 15/925,073

(22) Filed: Mar. 19, 2018

(65) Prior Publication Data
US 2018/0272890 A1    Sep. 27, 2018

(30) Foreign Application Priority Data

Mar. 22, 2017    (JP) .................................. 2017-055264

(51) Int. Cl.
| | |
|---|---|
| B60L 50/72 | (2019.01) |
| H01M 2/00 | (2006.01) |
| H01M 8/04007 | (2016.01) |
| H01M 8/0438 | (2016.01) |
| H01M 8/04089 | (2016.01) |
| B60L 58/33 | (2019.01) |
| B60L 3/00 | (2019.01) |
| H01M 8/04082 | (2016.01) |

(52) U.S. Cl.
CPC ............. *B60L 50/72* (2019.02); *B60L 3/0053* (2013.01); *B60L 58/33* (2019.02); *H01M 2/00* (2013.01); *H01M 8/04059* (2013.01); *H01M 8/04089* (2013.01); *H01M 8/04097* (2013.01); *H01M 8/04388* (2013.01); *H01M 8/04395* (2013.01); *B60L 2270/00* (2013.01); *B60Y 2410/00* (2013.01); *H01M 8/04201* (2013.01); *H01M 2250/20* (2013.01); *Y02T 90/40* (2013.01)

(58) Field of Classification Search
None
See application file for complete search history.

(56) References Cited

U.S. PATENT DOCUMENTS

| | | | |
|---|---|---|---|
| 2003/0108784 A1* | 6/2003 | Enjoji | ..................... H01M 8/02 429/434 |
| 2016/0297290 A1* | 10/2016 | Murata | .................... B60K 1/04 |
| 2017/0043655 A1* | 2/2017 | Aishima | .................. B60K 1/04 |
| 2017/0096172 A1* | 4/2017 | Nagaosa | ........... H01M 8/04201 |
| 2017/0101031 A1* | 4/2017 | Ohashi | ..................... B60L 50/71 |
| 2017/1009617 | 4/2017 | Nagaosa | |

FOREIGN PATENT DOCUMENTS

| | | |
|---|---|---|
| JP | 2015-231319 | 12/2015 |
| JP | 2016-199142 A | 12/2016 |
| WO | WO-2015163024 A1 * | 10/2015 |
| WO | WO-2015186438 A1 * | 12/2015 |

\* cited by examiner

*Primary Examiner* — Robert S Carrico
(74) *Attorney, Agent, or Firm* — Finnegan, Henderson, Farabow, Garrett & Dunner, LLP

(57) ABSTRACT

The fuel cell vehicle includes a fuel cell placed in a front room, an air compressor placed below the fuel cell in the front room to supply the fuel cell with cathode gas, and a refrigerant supply pump placed below the fuel cell in the front room to supply the fuel cell with a refrigerant. The refrigerant supply pump is placed forward of the air compressor.

4 Claims, 4 Drawing Sheets

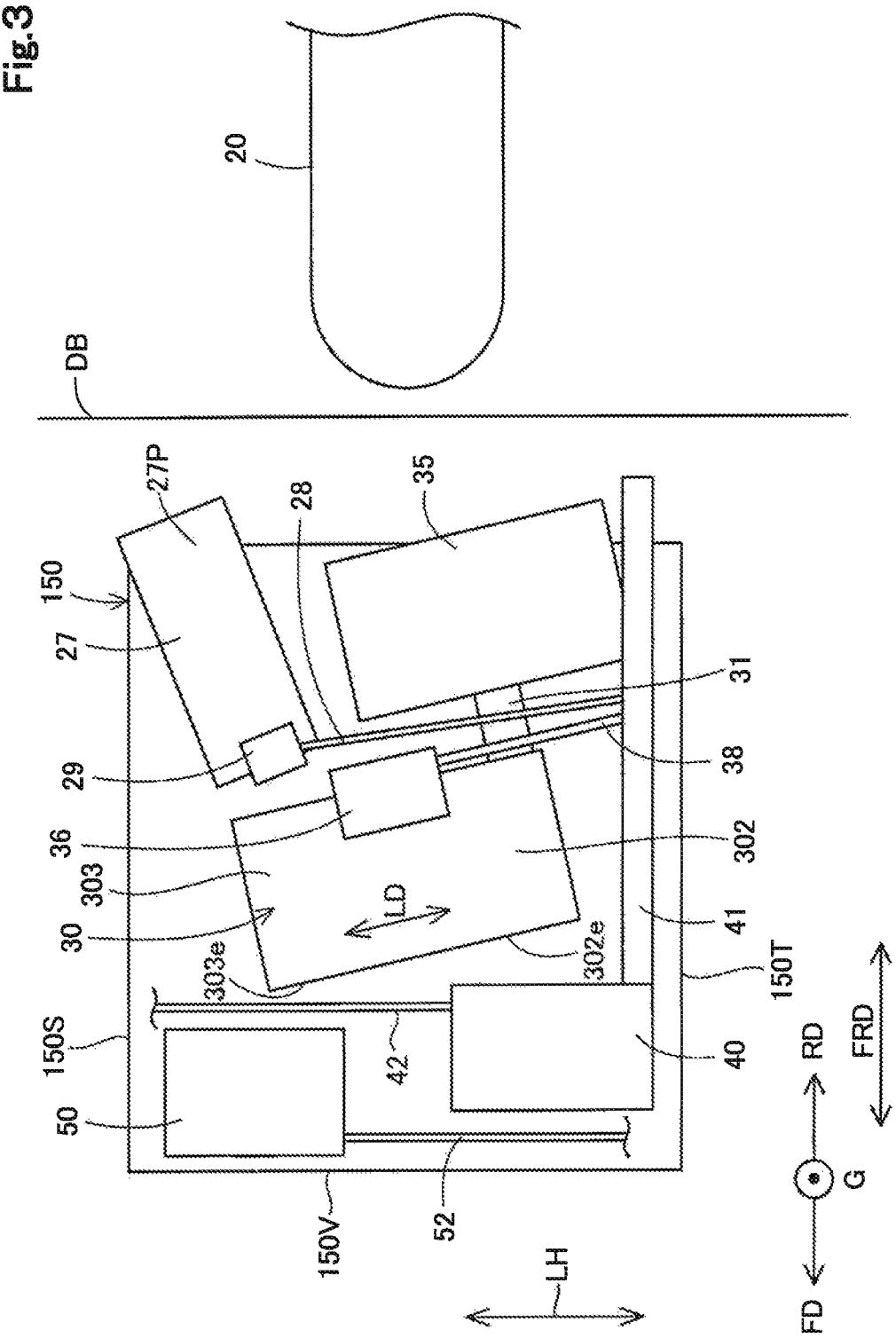

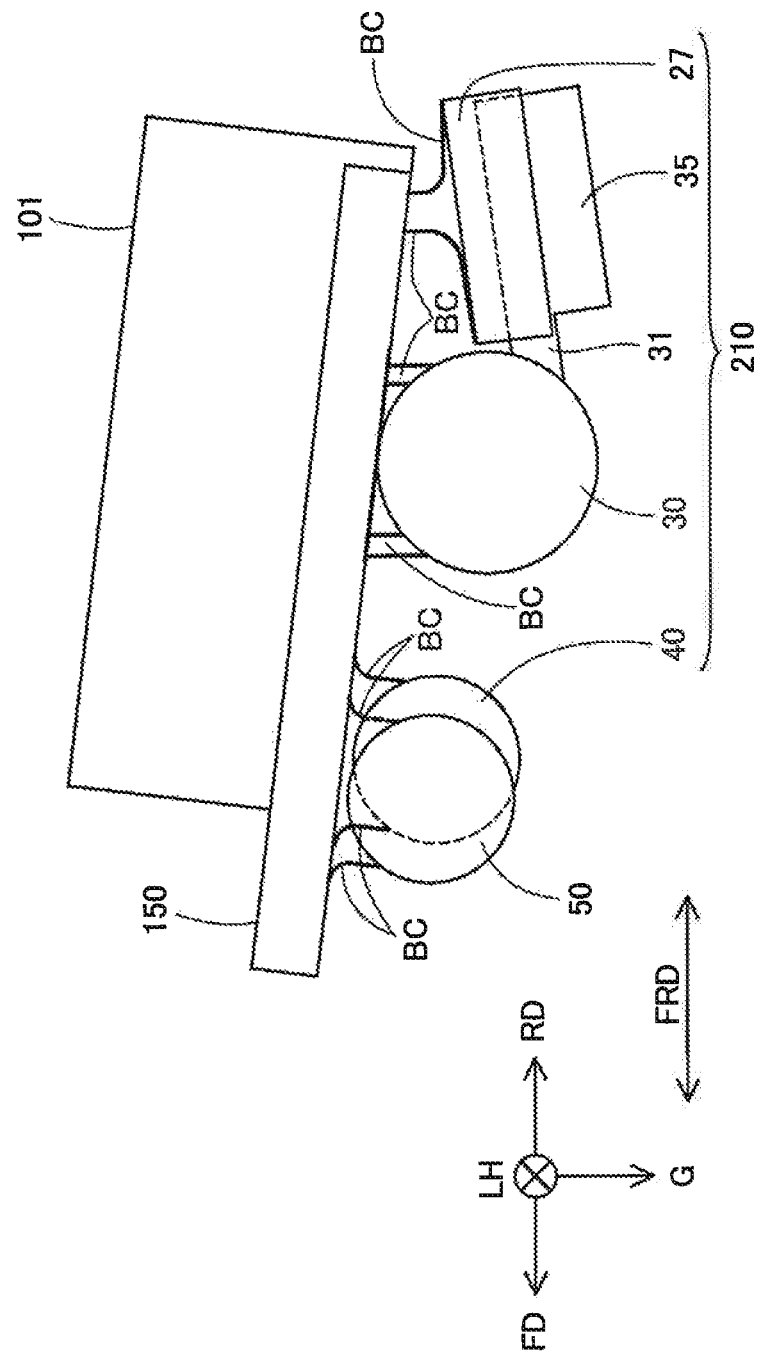

FUEL CELL VEHICLE

CROSS REFERENCE TO RELATED APPLICATIONS

This application claims priority to Japanese Patent Application No. 2017-055264 filed on Mar. 22, 2017, the entire contents of which are incorporated by reference herein.

BACKGROUND

Field

The present disclosure relates to a technique of fuel cell vehicles.

Related Art

Conventionally, there is known a technique of, in a fuel cell vehicle, placing a fuel cell and auxiliary machines (e.g., air compressor) for use with the fuel cell in a front room positioned forward of a vehicle compartment (e.g., JP 2015-231319 A). The air compressor supplies the fuel cell with cathode gas.

In a case where the air compressor or other auxiliary machines for the fuel cell are placed in the front room, there is a possibility that, upon occurrence of a forward collision on the fuel cell vehicle, shocks applied to the air compressor may cause the air compressor to be damaged. For example, on condition that the air compressor has higher voltage applied thereto than to the other auxiliary machines, damage to the air compressor, when involved, can cause its high-voltage portion to be exposed bare. Accordingly, there has been a desire, heretofore, for a technique that enables reduction in the possibility that the air compressor may be damaged.

SUMMARY

In one aspect of the present disclosure, there is provided a fuel cell vehicle having a vehicle compartment, and a front room positioned forward of the vehicle compartment. This fuel cell vehicle includes: a fuel cell placed in the front room; an air compressor placed below the fuel cell in the front room to supply the fuel cell with cathode gas; and a refrigerant supply pump placed below the fuel cell in the front room to supply the fuel cell with a refrigerant, wherein the refrigerant supply pump is placed forward of the air compressor.

BRIEF DESCRIPTION OF DRAWINGS

FIG. 3 is a first view for explaining a placement relationship among individual parts of the fuel cell vehicle; and FIG. 4 is a second view for explaining the placement relationship among the individual parts of the fuel cell vehicle.

RETAILED DESCRIPTION

A. Embodiment

Figure 1:
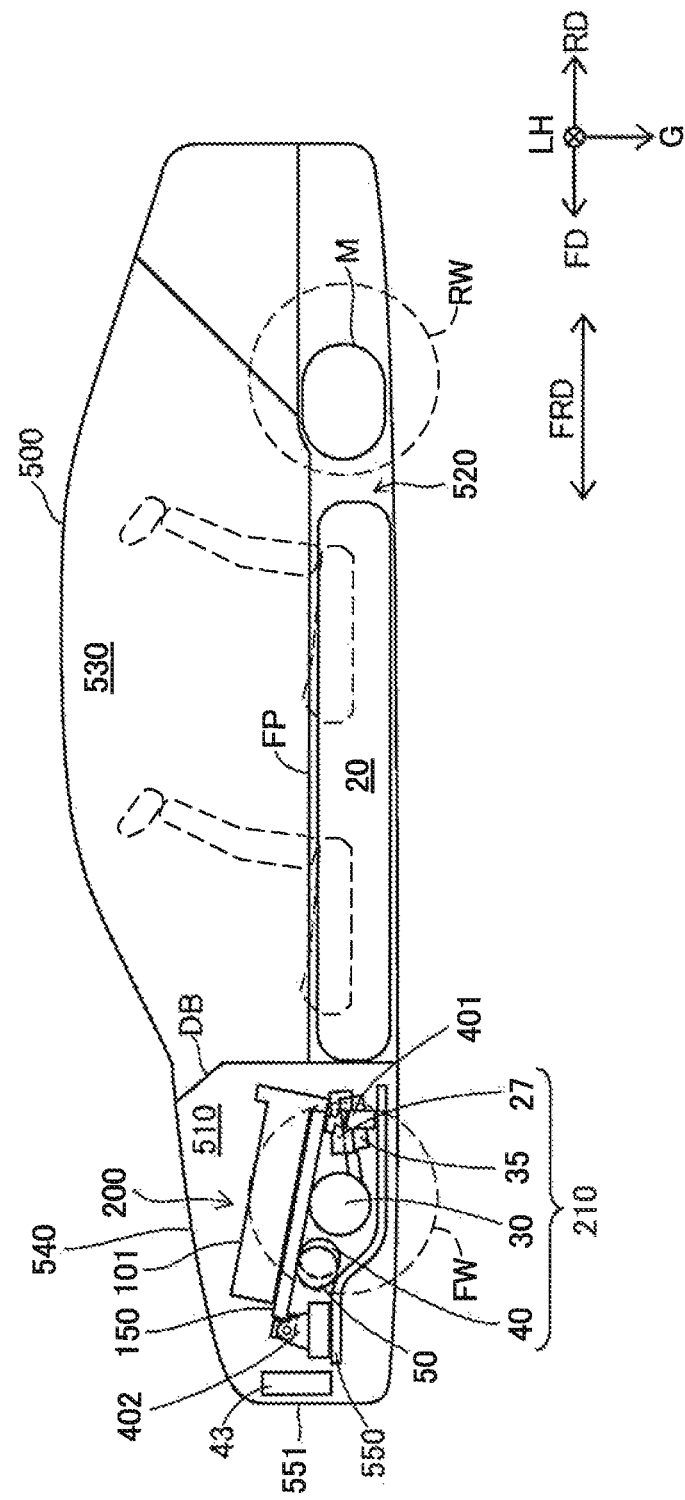
FIG. 1 is an explanatory view showing an outlined configuration of a fuel cell vehicle, as viewed in a cross section.

FIG. 1 is an explanatory view showing an outlined configuration of a fuel cell vehicle 500 which is an embodiment of the disclosure, as viewed in a cross section. Depicted in FIG. 1 is a cross section taken at a specified position in a widthwise direction LH of the fuel cell vehicle 500, the cross section extending along a forward direction directed forward FD of the vehicle as well as along a rearward direction directed rearward RD thereof. In this embodiment, the direction extending along the forward direction and the rearward direction is referred to as "forward/rearward direction FR." In the fuel cell vehicle 500, a fuel cell 101 is mounted as an electric power source, and driving a motor M as a motive power source causes rear wheels RW to be driven. In FIG. 1, a gravitational direction, i.e., a vertically downward direction G is indicated in addition to the widthwise direction LH, the forward direction directed forward FD, and the rearward direction directed rearward RD of the fuel cell vehicle 500. Signs and arrows indicating the individual directions in FIG. 1 correspond to signs and arrows indicating the individual directions of the other figures.

The fuel cell vehicle 500 includes a front room 510, a tank housing compartment 520, and a vehicle compartment 530. The front room 510 and the tank housing compartment 520 plus the vehicle compartment 530 are partitioned by a dashboard DB. The tank housing compartment 520 and the vehicle compartment 530 are partitioned by a floor panel FP. The vehicle compartment 530 is a room in which passengers are to be accommodated, with a plurality of seats provided therein as indicated by broken line in FIG. 1. The vehicle compartment 530 is positioned roughly over a zone defined between a pair of front wheels FW and a pair of rear wheels RW. The front room 510 is positioned forward FD of the vehicle compartment 530. The tank housing compartment 520 is positioned rearward RD of the front room 510 and below the vehicle compartment 530.

Placed in the front room 510 are a suspension member 550 as well as at least some of component elements of a fuel cell system 200 including the fuel cell 101. The suspension member 550 is a columnar member whose lengthwise direction extends along the forward/rearward direction FRD and which is placed below the fuel cell 101. Although not shown, another suspension member 550 of generally similar shape is placed separately with a specified distance in the widthwise direction LH. That is, a pair of suspension members 550 placed with a specified distance therebetween in the widthwise direction LH are placed in the front room 510. Each suspension member 550 has such a shape as to be bent halfway along the forward/rearward direction FRD. More specifically, both front portion and rear portion of each suspension member 550 are placed generally parallel to the forward/rearward direction FRD. The front portion of the suspension member 550 is positioned above the rear portion of the suspension member 550. Central portion of the suspension member 550 has such a gently inclined shape that its position goes lower and lower over a range from connecting portion with the front portion toward connecting portion with the rear portion. A rear end portion of the suspension member 550 is fixed to an unshown side member. The side member is a member forming part of a vehicle body frame, i.e., a vehicle skeleton, which is a columnar member whose lengthwise direction is along the forward/rearward direction FRD. On the other hand, a front end portion of the suspension member 550 is opened.

The fuel cell 101 and a support frame 150 are placed in the front room 510. The fuel cell 101 is a stacked body including a plurality of unit cells stacked together. In this embodiment, the fuel cell 101 is a solid polymer type fuel cell. The support frame 150 is a plate-shaped member that supports the fuel cell 101 from below. The fuel cell 101 is placed with such an inclination as to be positioned lower and lower along its extension toward one side approaching a tank 20 (i.e., toward the rearward RD side) in the forward/rearward direction FRD. By virtue of such inclined placement of the fuel cell 101, water within the fuel cell 101 can be gathered to the rearward RD side and discharged out of the fuel cell 101 easily by exploiting gravitational force.

Rear side portion of the support frame 150 is fitted to the suspension members 550 by a rear-side fitting portion 401. Front side portion of the support frame 150 is fitted to the suspension members 550 by a front-side fitting portion 402.

The fuel cell system 200 further includes auxiliary machines 210 which are operated under power generation of the fuel cell 101. The auxiliary machines 210 are placed below the fuel cell 101 and the support frame 150 in the front room 510. The auxiliary machines 210 include an anode offgas circulation pump 27, an air compressor 30, a refrigerant supply pump 40, and an intercooler 35. The anode offgas circulation pump 27, the air compressor 30, and the refrigerant supply pump 40 are each fitted to the support frame 150 via metal fittings such as brackets. The anode offgas circulation pump 27 circulates anode offgas through the fuel cell vehicle 500. The term of anode offgas refers to unreacted anode gas discharged from the fuel cell 101. The air compressor 30 supplies air as a cathode gas to the fuel cell 101. The refrigerant supply pump 40 supplies cooling water as a refrigerant to the fuel cell 101. The intercooler 35 cools cathode gas of increased temperature fed out from the air compressor 30 to the fuel cell 101.

The fuel cell vehicle 500 is equipped with an air-conditioner compressor 50 as an auxiliary machine of the fuel cell vehicle 500. The air-conditioner compressor 50 supplies, toward a heat exchanger (not shown), an air-conditioning refrigerant to be used in an air conditioner mounted on the fuel cell vehicle 500. The air-conditioner compressor 50 is placed below the fuel cell 101 and the support frame 150 in the front room 510.

Various component parts configuring the fuel cell vehicle 500 are placed on the forward FD side of the auxiliary machines 210 and the air-conditioner compressor 50. The various component parts are exemplified by part of a hood 540, a radiator 43, a component 551 (e.g., front grille) forming a front face of the fuel cell vehicle 500, and the like.

The tank housing compartment 520 houses the tank 20 therein. The tank 20 is filled with hydrogen gas as the anode gas. The tank housing compartment 520 is positioned rearward RD of the front room 510 under the floor of the fuel cell vehicle 500. Also, the tank housing compartment 520 is formed at a generally center of the widthwise direction LH so as to extend along the forward/rearward direction FRD. Ceiling portion of the tank housing compartment 520 is formed by the floor panel FP of the vehicle compartment 530. Portion of the floor of the vehicle compartment 530 corresponding to the tank housing compartment 520 is protruded vertically upward of the other portion of the floor. Like this, the tank housing compartment 520 is similar in shape to a center tunnel in which a drive shaft of the vehicle with an engine mounted thereon is placed.

Figure 2:
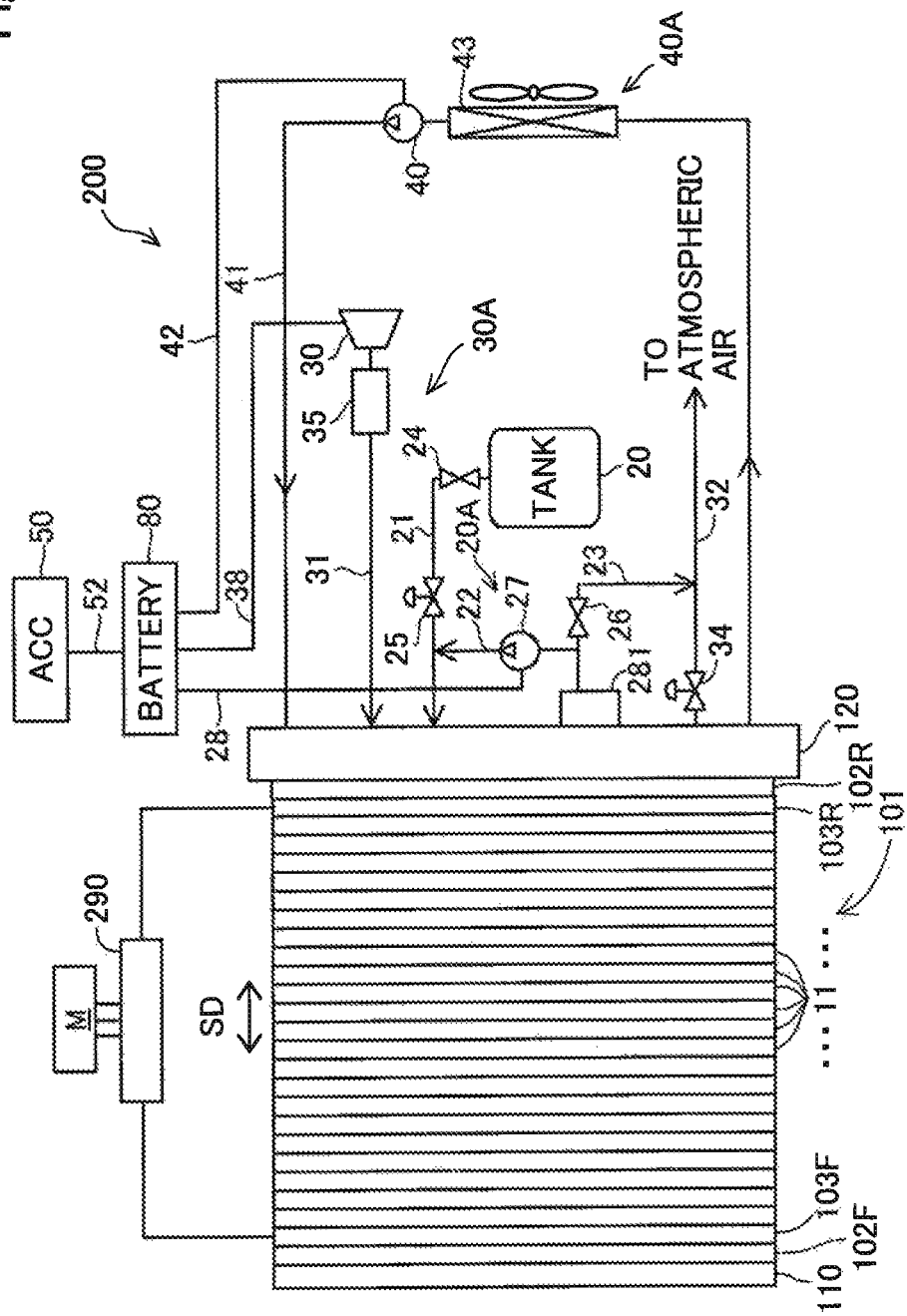
FIG. 2 is a block diagram showing an outlined configuration of a fuel cell system.

FIG. 2 is a block diagram showing an outlined configuration of the fuel cell system 200. For explanation's sake, component parts (e.g., air-conditioner compressor 50) other than those configuring the fuel cell system 200 are also shown in FIG. 2. The fuel cell system 200 includes an anode gas supply/discharge system 20A, a cathode gas supply/discharge system 30A, and a refrigerant circulation system 40A, in addition to the above-described fuel cell 101.

The fuel cell 101 includes a plurality of unit cells 11 stacked together as well as a pair of end plates 110, 120 at both end portions in its stacking direction SD. The end plate 110 is referred to also as first end plate 110, and the end plate 120 is referred to also as second end plate 120. Each unit cell 11 generates electric power through electrochemical reactions between anode gas and cathode gas, where the anode gas is supplied to an anode-side catalytic electrode layer and the cathode gas is applied to a cathode-side catalytic electrode layer both of which layers are provided so as to hold the solid polymer electrolyte membrane therebetween. In this embodiment, the anode gas is hydrogen gas and the cathode gas is air. The fuel cell 101 is installed such that the second end plate 120 is positioned rearward RD of the first end plate 110 (FIG. 1). Inside the fuel cell 101, manifolds (not shown) for circulating the anode gas, the cathode gas and the refrigerant are formed along the stacking direction SD of the unit cells 11.

The pair of end plates 110, 120 hold therebetween the stacked body including the plurality of unit cells 11. Out of the pair of end plates 110, 120, the second end plate 120 has a function of supplying anode gas, cathode gas and cooling medium to the manifolds formed in the fuel cell 101 as well as a function of providing flow paths for discharging these mediums. On the other hand, the first end plate 110 has no such functions. Both the first end plate 110 and the second end plate 120 have a generally plate-shaped external shape whose thicknesswise direction coincides with the stacking direction SD.

A pair of current collecting plates 103F, 103R in the fuel cell 101 are electrically connected to a DC/DC converter 290. An insulating plate 102F is placed between the current collecting plate 103F and the first end plate 110. Similarly, an insulating plate 102R is placed between the current collecting plate 103R and the second end plate 120. The DC/DC converter 290 is electrically connected to the motor M to step up an output voltage of the fuel cell 101 and supplies the voltage to the motor M.

The anode gas supply/discharge system 20A includes the above-mentioned tank 20, an anode gas supply path 21 as piping, a main stop valve 24, a pressure regulating valve 25, an anode gas circulation path 22 as piping, a gas-liquid separator 281, the above-mentioned anode offgas circulation pump 27, an opening/closing valve 26, and a discharge path 23 as piping. The anode gas supply path 21 is connected to the tank 20 and the fuel cell 101. The anode gas supply path 21 is a flow path that allows hydrogen gas in the tank 20 to be circulated to the fuel cell 101. The main stop valve 24 is provided on the anode gas supply path 21 to change over between execution and halt of hydrogen gas supply from the tank 20 in response to an instruction from an unshown controller. The pressure regulating valve 25 is provided downstream of the main stop valve 24 in the anode gas supply path 21. The pressure regulating valve 25 regulates pressure of the anode gas supplied to the fuel cell 101 in response to an instruction from the unshown controller.

The anode gas circulation path 22 is a flow path that allows anode offgas (referred to also as "anode exhaust gas"), which has been discharged from the fuel cell 101, to be circulated again to the anode gas supply path 21. The gas-liquid separator 281 separates liquid water from liquid water-mixed anode offgas, where impurity gases such as nitrogen gas contained in the anode offgas are separated along with the liquid water. The anode offgas circulation pump 27 is placed downstream of the gas-liquid separator 281 in the anode gas circulation path 22. The anode offgas circulation pump 27 supplies anode offgas, which has been discharged from the fuel cell 101, again to the anode gas supply path 21 in response to an instruction from the unshown controller. That is, the anode offgas circulation pump 27 circulates the anode offgas to the fuel cell 101. The opening/closing valve 26 is provided on the discharge path 23. The discharge path 23 is connected to a cathode gas discharge path 32. The opening/closing valve 26 goes to an open state at a specified timing in response to an instruction from the unshown controller. As a result, the separated liquid water and nitrogen gas are allowed to pass through the discharge path 23 and the cathode gas discharge path 32, being released out of the system.

The cathode gas supply/discharge system 30A includes the above-mentioned air compressor 30, the above-mentioned intercooler 35, a cathode gas supply path 31 as piping, a cathode gas discharge path 320 as piping, and a pressure regulating valve 34. The cathode gas supply path 31 is connected to the fuel cell 101. The cathode gas supply path 31 is a flow path that allows outside air to be circulated to the fuel cell 101. The air compressor 30 is provided on the cathode gas supply path 31. The intercooler 35 is provided downstream of the air compressor 30 in the cathode gas supply path 31. The cathode gas discharge path 32 is a flow path that allows cathode gas derived from the fuel cell 101 to be discharged outside. The pressure regulating valve 34 is provided on the cathode gas discharge path 32 and has its degree of opening regulated in response to an instruction from the unshown controller. As a result of this, back pressure on the cathode side of the fuel cell 101 is regulated.

The refrigerant circulation system 40A includes a refrigerant circulation path 41 as piping, the above-mentioned refrigerant supply pump 40, and a radiator 43. The refrigerant circulation path 41 is a flow path that allows a refrigerant (e.g., water) for cooling the fuel cell 101 to be circulated. The refrigerant supply pump 40 circulates the refrigerant in the refrigerant circulation path 41 to the refrigerant circulation path 41 and the fuel cell 101 in response to an instruction from the unshown controller. That is, the refrigerant supply pump 40 supplies the refrigerant to the fuel cell 101. The radiator 43, having a fan for intake of outside air, performs heat exchange between the refrigerant in the refrigerant circulation path 41 and outside air to cool the refrigerant.

The fuel cell system 200 further includes a battery 80. The battery 80, being a secondary battery, may be implemented by a chargeable/dischargeable lithium ion battery or nickel hydrogen battery. For example, the battery 80 is electrically connected to the air compressor 30, the refrigerant supply pump 40, the anode offgas circulation pump 27, and the air-conditioner compressor 50 via cables 38, 42, 28, 52 to supply electric power to the individual parts 30, 40, 27, 50. The cables 38, 42, 28, 52 are connected to terminal portions (not shown) provided in the air compressor 30, the refrigerant supply pump 40, the anode offgas circulation pump 27, and the air-conditioner compressor 50, respectively.

The battery 80 is chargeable with output power derived from the fuel cell 101. In addition, the air compressor 30, the refrigerant supply pump 40, the anode offgas circulation pump 27, and the air-conditioner compressor 50 may be supplied with electric power from the fuel cell 101. By DC/DC converters (not shown) provided in correspondence to the individual parts 30, 40, 27, 50, output voltage of the battery 80 is stepped up to operating voltages responsive to levels of electric power demanded by the individual parts 30, 40, 27, 50, respectively. As a result of this, electric power of levels responsive to respective operating voltages of the air compressor 30, the refrigerant supply pump 40, the anode off gas circulation pump 27, and the air-conditioner compressor 50 is supplied from the battery 80. It is noted that the output power of the battery 80 is converted into three-phase AC power by inverters (not shown) provided in correspondence to the individual parts 30, 40, 27, 50, respectively, and thereafter supplied to the air compressor 30, the refrigerant supply pump 40, the anode offgas circulation pump 27, and the air-conditioner compressor 50. As a result of this, the air compressor 30, the refrigerant supply pump 40, the anode offgas circulation pump 27, and the air-conditioner compressor 50 are driven. In this connection, out of the air compressor 30, the refrigerant supply pump 40, the anode offgas circulation pump 27, and the air-conditioner compressor 50, it is the air compressor 30 that is the highest element in terms of maximum voltage applied by a demand from the fuel cell vehicle 500. That is, the air compressor 30 is capable of having higher voltage applied thereto than to the refrigerant supply pump 40, the anode offgas circulation pump 27, and the air-conditioner compressor 50. A maximum voltage applied to the air compressor 30 is 200 V or more, as an example.

FIG. 3 is a first view for explaining a placement relationship among individual parts of the fuel cell vehicle 500. FIG. 4 is a second view for explaining the placement relationship among the individual parts of the fuel cell vehicle 500. In this case, FIG. 3 is a schematic view as the forward FD side of the fuel cell vehicle 500 including the front room 510 is viewed from the vertically downward G side. FIG. 4 is also a schematic view, in the fuel cell vehicle 500 laid on a horizontal plane, as the fuel cell 101, the support frame 150, and the auxiliary machines 210 are viewed from the left side of the fuel cell vehicle 500.

As shown in FIG. 4, the anode offgas circulation pump 27, the air compressor 30, and the refrigerant supply pump 40 are each fitted to the support frame 150 via brackets BC. As shown in FIG. 3, the cables 38, 42, 28, 52 are connected to their corresponding terminal portions of the air compressor 30, the refrigerant supply pump 40, the anode offgas circulation pump 27, and the air-conditioner compressor 50, respectively. In FIG. 3, only the terminal portion 36 of the air compressor 30 and the terminal portion 29 of the anode offgas circulation pump 27 are depicted. In this embodiment, with respect to the widthwise direction LH, a center of the support frame 150 and a vehicle body center of the fuel cell vehicle 500 are coincident with each other.

As shown in FIG. 3, when the fuel cell vehicle 500 is viewed from the vertically downward G side, the refrigerant supply pump 40 and the air-conditioner compressor 50 are positioned rearward RD of a front end portion 150V of the support frame 150. Also as shown in FIG. 3, when the fuel cell vehicle 500 is viewed from the vertically downward G side, the refrigerant supply pump 40, the air-conditioner compressor 50, and the air compressor 30 are positioned inside an outer edge of the support frame 150. Further, when the fuel cell vehicle 500 is viewed from the vertically downward G side, most part of the anode offgas, circulation pump 27 and the intercooler 35 is positioned inside the outer edge of the support frame 150. For example, the front end portion 150V forming the outer edge out of the support frame 150 is positioned forward FD of the air-conditioner compressor 50 and the refrigerant supply pump 40.

The refrigerant supply pump 40 is placed forward FD of the air compressor 30. More specifically, when the fuel cell vehicle 500 is viewed from the forward FD side, the refrigerant supply pump 40 is placed forward FD of the air compressor 30 such that at least part of the refrigerant supply pump 40 overlaps with the air compressor 30. Also, as compared with one lateral portion of the support frame 150 in the widthwise direction LH, the refrigerant supply pump 40 is placed closer to the other lateral portion 150T of the support frame 150. In this embodiment, the terms, "when the fuel cell vehicle 500 is viewed from the forward FD side," refers to when the fuel cell vehicle 500 is viewed from its very front.

The air-conditioner compressor 50 is placed forward FD of the air compressor 30. More specifically, when the fuel cell vehicle 500 is viewed from the forward FD side, the air-conditioner compressor 50 is placed forward FD of the air compressor 30 such that at least part of the air-conditioner compressor 50 overlaps with the air compressor 30. Also, the air-conditioner compressor 50 is placed so as to be closer to the one lateral portion 150S in the support frame 150 than to the other lateral portion 150T with respect to the widthwise direction LH. Further, the air-conditioner compressor 50 is placed so as to be separate from the refrigerant supply pump 40 without overlapping therewith in terms of the widthwise direction LH.

The anode offgas circulation pump 27 is placed rearward RD of the air compressor 30. More specifically, the anode offgas circulation pump 27 is placed so as to be closer to the other lateral portion 150T in the support frame 150 than to the one end portion 150S with respect to the widthwise direction LH. The anode offgas circulation pump 27 is opposed to the air-conditioner compressor 50 with the air compressor 30 interposed therebetween in the forward/rearward direction FRD. Also, the anode offgas circulation pump 27 has a rear-end side portion 27P placed at such a position as not to overlap with the tank 20 as the fuel cell vehicle 500 is viewed from the forward FD side. The rear-end side portion 27P is a portion including a rear end of the anode offgas circulation pump 27 in the forward/rearward direction FRD.

The intercooler 35 is placed rearward RD of the air compressor 30. More specifically, the intercooler 35 is placed such that part of the intercooler 35 is positioned between the air compressor 30 and the tank 20. The intercooler 35 is placed so as to be closer to the other lateral portion 150T of the support frame 150 with respect to the widthwise direction LH. The intercooler 35 is opposed to the refrigerant supply pump 40 with the air compressor 30 interposed therebetween with respect to the forward/rearward direction FRD.

The air compressor 30 is placed such that its terminal portion 36 is positioned on the rearward RD side, and moreover that a lengthwise direction LD of the air compressor 30 is generally along the widthwise direction LH. In this embodiment, when an angle formed by the widthwise direction LH and the lengthwise direction LD is 30° or less as an example, it can be said that the lengthwise direction LD and the widthwise direction LH are generally along each other. The air compressor 30 includes a first portion 302 positioned between the refrigerant supply pump 40 and the intercooler 35 in the forward/rearward direction FRD, and a second portion 303 positioned on one side of the widthwise direction LH opposed to the refrigerant supply pump 40 and the intercooler 35 (i.e., on the one lateral portion 150S side positioned on the vehicle body left side of the fuel cell vehicle 500 in this embodiment). The air-conditioner compressor 50 and the anode offgas circulation pump 27 are placed on the same side of the widthwise direction LH as the second portion 303 is placed. In more detail, the second portion 303 is positioned between the air-conditioner compressor 50 and the anode offgas circulation pump 27 in the forward/rearward direction FRD. The air compressor 30 is placed such that the first portion 302 is inclined so as to be positioned rearward of the second portion 303 in the forward/rearward direction FRD. That is, a front end portion 302e of the first portion 302 is positioned rearward RD of a front end portion 303e of the second portion 303 in the forward/rearward direction FRD. In other words, the air compressor 30 is placed such that, with the fuel cell vehicle 500 viewed from the vertically downward G side, from a state in which the lengthwise direction LD and the widthwise direction LH are parallel to each other, the air compressor 30 is turned about an axis extending along the vertically downward G direction in such a direction that the first portion 302 goes farther from the refrigerant supply pump 40.

According to this embodiment, since the refrigerant supply pump 40 is placed forward FD of the air compressor 30 as shown in FIG. 3, shocks applied from the forward FD side to the air compressor 30 upon occurrence of a forward collision of the fuel cell vehicle 500 can be relieved by the refrigerant supply pump 40. As a result, a possibility that the air compressor 30 may be damaged can be reduced. When the fuel cell vehicle 500 has come into a forward collision, a component part 551 (FIG. 1) as an example may be moved, in a crashing-like way, toward the rearward RD side. In such a case, shocks applied from the component part 551 moving toward the rearward RD side can be relieved by the refrigerant supply pump 40. That is, by the refrigerant supply pump 40 serving as a shock-absorbing material, the possibility that the air compressor 30 may be damaged can be reduced.

Also according to this embodiment, since the intercooler 35 is placed rearward RD of the air compressor 30 as shown in FIG. 3, shocks applied from the rearward RD side to the air compressor 30 upon occurrence of a forward collision of the fuel cell vehicle 500 can be relieved by the intercooler 35. As a result, the possibility that the air compressor 30 may be damaged can be further reduced. Upon occurrence of a forward collision of the fuel cell vehicle 500, the tank 20 as an example may be moved toward the forward FD side by inertia force. In such a case, shocks applied from the tank 20 moving toward the forward FD side can be relieved by the intercooler 35. That is, by the intercooler 35 serving as a shock-absorbing material, the possibility that the air compressor 30 may be damaged can be reduced. In addition, even in a case where the intercooler 35 is damaged by shocks, the intercooler 35 is supplied with no electric power, resulting in no more than leak-out of internal air to outside, so that a fear for deterioration in safety can be reduced.

Also according to this embodiment, the air compressor 30 has the first portion 302 positioned rearward RD of the second portion 303 with respect to the forward/rearward direction FRD as shown in FIG. 3. Therefore, as compared with the case where the first portion 302 is positioned at the same position as the second portion 303 or positioned forward FD of the second portion 303 with respect to the forward/rearward direction FRD, the refrigerant supply pump 40 placed forward FD of the first portion 302 can be placed on the further rearward RD side. That is, a space for placement of the refrigerant supply pump 40 can be ensured on the further rearward RD side. As a result, there can be allowed larger distances to other component parts (e.g., component part 551 and radiator 43 shown in FIG. 1) of the fuel cell vehicle 500 positioned forward FD of the refrigerant supply pump 40. Thus, upon occurrence of a forward collision of the fuel cell vehicle 500, shocks applied from the forward FD side to the refrigerant supply pump 40 can be reduced, so that the possibility that the refrigerant supply pump 40 may be damaged can be reduced.

Also according to this embodiment, when the fuel cell vehicle 500 is viewed from the forward FD side, the anode offgas circulation pump 27 has the rear-end side portion 27P (FIG. 3) that is placed so as not to overlap with the tank. As a result, even in a case where the tank 20 is moved toward the forward FD side upon occurrence of a forward collision of the fuel cell vehicle 500, the possibility that the tank 20 may directly collide with the anode offgas circulation pump 27 can be reduced.

Also according to this embodiment, out of the air compressor 30, the refrigerant supply pump 40, the anode offgas circulation pump 27, and the air-conditioner compressor 50, the element to which the highest voltage can be applied is the air compressor 30. According to this embodiment, there can be reduced a possibility that the air compressor 30, which is a high voltage component, may be damaged upon occurrence of a forward collision of the fuel cell vehicle 500. As a result, a possibility that passengers or the like may suffer an electric shock due to an interior exposure of the terminal portion 36 can be reduced. Thus, the safety of the fuel cell vehicle 500 can be improved.

Also according to this embodiment, as shown in FIG. 3, when the fuel cell vehicle 500 is viewed from the vertically downward G side, the refrigerant supply pump 40 and the air-conditioner compressor 50 are positioned rearward RD of the front end portion 150V of the support frame 150. That is, part of the support frame 150 is placed forward FD of the refrigerant supply pump 40 and the air-conditioner compressor 50 in the forward/rearward direction FRD. Therefore, in a case where a component part (e.g., the component part 551 or the radiator 43 shown in FIG. 1) placed on the further forward FD side is moved toward the rearward RD side due to a shock upon occurrence of a forward collision of the fuel cell vehicle 500, the possibility that the moving component part may collide with the refrigerant supply pump 40 and the air-conditioner compressor 50 can be reduced by the support frame 150. As a result of this, the safety of the fuel cell vehicle 500 can be further improved. Moreover, as shown in FIG. 3, the air compressor 30 as well as the refrigerant supply pump 40 and the air-conditioner compressor 50 both positioned forward FD of the air compressor 30 are positioned inward of the outer edge of the support frame 150, as fuel cell vehicle 500 is viewed from the vertically downward G side. Therefore, in the case where a component part placed outward of the outer edge of the support frame 150 is moved closer to the refrigerant supply pump 40 or the air-conditioner compressor 50 upon occurrence of a collision of the fuel cell vehicle 500, the possibility that the moving component part may collide with the refrigerant supply pump 40 and the air-conditioner compressor 50 can be reduced by the support frame 150. Thus, the safety of the fuel cell vehicle 500 can be even further improved.

Also according to this embodiment, the second end plate 120 is positioned rearward RD of the first end plate 110, and the second end plate 120 has a function (e.g., opening) of supplying/discharging reactant gases (anode gas and cathode gas) and the cooling medium into/from the fuel cell 101. Also according to this embodiment, the anode offgas circulation pump 27 and the intercooler 35 are placed rearward RD of the air compressor 30. As a result, the anode gas circulation path 22 for connecting the anode offgas circulation pump 27 and the fuel cell 101 to each other, as well as the cathode gas supply path 31 for connecting the intercooler 35 and the fuel cell 101 to each other, can be made shorter than when connected to the first end plate 110. As a result, increases in pressure loss of the anode gas circulation path 22 and the cathode gas supply path 31 can be suppressed.

Further, since the anode gas circulation path 22 may be placed on the rearward RD side near the second end plate 120, a possibility that water in the anode gas circulation path 22 may be frozen, or steam in the anode gas circulation path 22 may be condensed, can be reduced by heat generation due to power generation of the fuel cell 101. Therefore, a possibility that the power generation performance of the fuel cell 101 may be deteriorated can be reduced.

Also according to this embodiment, the air-conditioner compressor 50 and the refrigerant supply pump 40 are placed forward FD of the air compressor 30, while the anode offgas circulation pump 27 and the intercooler 35 are placed rearward RD of the air compressor 30. Thus, there can be ensured enough space, forward FD of the air compressor 30, for placing the cable 52 for the air-conditioner compressor 50 and the cable 42 for the refrigerant supply pump 40.

B. Modifications

The present disclosure is not limited to the above-described examples and embodiment, and may be implemented in various aspects unless those aspects depart from the gist of the disclosure, including exemplary modifications described below.

B-1. First Modification

In the foregoing embodiment, the intercooler 35 may be placed other than rearward RD of the air compressor 30. Also in the embodiment, the air compressor 30 may be such that the first portion 302 is positioned other than rearward RD of the second portion 303 in the forward/rearward direction FRD. For example, the air compressor 30 may be such that the lengthwise direction LD and the widthwise direction LH are parallel to each other. Also in the embodiment, the anode offgas circulation pump 27 may entirely overlap with the tank 20, or may other than entirely overlap with the tank 20, when the fuel cell vehicle 500 is viewed from the forward FD side. Also, out of the air compressor 30, the refrigerant supply pump 40, the anode offgas circulation pump 27, and the air-conditioner compressor 50, it may be other than the air compressor 30 that is the highest element in terms of maximum voltage applied by a demand from the fuel cell vehicle 500. Even in this case, by virtue of the refrigerant supply pump 40 being placed forward FD of the air compressor 30, shocks applied from the forward FD side to the air compressor 30 upon occurrence of a forward collision of the fuel cell vehicle 500 can be relieved by the refrigerant supply pump 40.

The present disclosure is not limited to the above-described embodiments, examples and modifications and may be implemented in various configurations unless those configurations depart from the gist of the disclosure. For example, technical features in the embodiment, examples and modifications corresponding to technical features in the individual aspects described in the section of Summary may be replaced or combined with one another, as required, in order to solve part or entirety of the above-described problems or to achieve part or entirety of the above-described advantageous effects. Moreover, those technical features may be deleted, as required, unless herein otherwise described as indispensable. The present disclosure may be implemented by aspects described below.

(1) In one aspect of the present disclosure, there is provided a fuel cell vehicle having a vehicle compartment, and a front room positioned forward of the vehicle compartment. This fuel cell vehicle includes: a fuel cell placed in the front room; an air compressor placed below the fuel cell in the front room to supply the fuel cell with cathode gas; and a refrigerant supply pump placed below the fuel cell in the front room to supply the fuel cell with a refrigerant, wherein the refrigerant supply pump is placed forward of the air compressor. According to this aspect, since the refrigerant supply pump is placed forward of the air compressor, shocks applied from the forward side (e.g., component parts of the fuel cell vehicle positioned forward of the refrigerant supply pump) to the air compressor upon occurrence of a forward collision of the fuel cell vehicle can be relieved by the refrigerant supply pump. As a result, a possibility that the air compressor may be damaged can be reduced.

(2) In the above-described aspect, the fuel cell vehicle may further include an intercooler placed below the fuel cell in the front room to cool the cathode gas fed out from the air compressor, wherein the intercooler is placed rearward of the air compressor. According to this aspect, since the intercooler is placed rearward of the air compressor, shocks applied from the rearward side (e.g., component parts of the fuel cell vehicle positioned rearward of the intercooler) to the air compressor upon occurrence of a forward collision of the fuel cell vehicle can be relieved by the intercooler. As a result, the possibility that the air compressor may be damaged can be further reduced.

(3) In the above-described aspect, the intercooler may be opposed to the refrigerant supply pump with the air compressor interposed therebetween, the air compressor may include a first portion positioned between the refrigerant supply pump and the intercooler in a forward/rearward direction of the fuel cell vehicle, and a second portion positioned on one side in a widthwise direction of the fuel cell vehicle, to more than an extent to which the refrigerant supply pump and the intercooler are positioned on the one side, and the air compressor may be placed such that the first portion is inclined rearward of the second portion in the forward/rearward direction. According to this aspect, since the air compressor is positioned rearward of the second portion in the forward/rearward direction, the refrigerant supply pump placed forward of the first portion can be placed on the rearward side, more than when the first portion is positioned at the same position as the second portion or positioned forward of the second portion in the forward/rearward direction. As a result, there can be allowed larger distances to other component parts of the fuel cell vehicle positioned forward of the refrigerant supply pump. Therefore, shocks applied from the forward side to the refrigerant supply pump upon occurrence of a forward collision of the fuel cell vehicle can be relieved. Thus, the possibility that the refrigerant supply pump may be damaged can be reduced.

(4) In the above-described aspect, the fuel cell vehicle may further include: an anode offgas circulation pump placed below the fuel cell and rearward of the air compressor in the front room to circulate anode offgas to the fuel cell; and a tank placed below the vehicle compartment and filled with anode gas to be supplied to the fuel cell, wherein at least a rear side portion of the anode offgas circulation pump is placed at such a position as not to overlap with the tank as the fuel cell vehicle is viewed from a forward side. According to this aspect, since the anode offgas circulation pump include the rear side portion placed at such a position as not to overlap with the tank as the fuel cell vehicle is viewed from the forward side, a possibility that the tank may collide directly with the anode offgas circulation pump can be reduced even when the tank is moved forward due to a forward collision of the fuel cell vehicle.

(5) In the above-described aspect, the air compressor may allow a higher voltage to be applied thereto than applied to the refrigerant supply pump. According to this aspect, upon occurrence of a forward collision of the fuel cell vehicle, there can be reduced a possibility that the air compressor, which allows a higher voltage to be applied thereto than applied to the refrigerant supply pump may be damaged. Thus, the safety of the fuel cell vehicle can be improved.

The present disclosure may be implemented in various modes other than the above-described fuel cell vehicles. For example, the disclosure may be implemented in such forms as fuel cell vehicle manufacturing methods, and the like.

What is claimed is:

1. A fuel cell vehicle having a vehicle compartment, and a front room positioned forward of the vehicle compartment, the fuel cell vehicle comprising:
   a fuel cell placed in the front room;
   an air compressor placed below the fuel cell in the front room to supply the fuel cell with cathode gas;
   a refrigerant supply pump placed below the fuel cell in the front room to supply the fuel cell with a refrigerant; and
   an intercooler placed below the fuel cell in the front room and configured to cool the cathode gas fed out from the air compressor, wherein
   when the fuel cell vehicle is viewed from a forward side in a forward/rearward direction of the fuel cell vehicle, the refrigerant supply pump is placed forward of the air compressor such that at least part of the refrigerant supply pump overlaps with the air compressor,
   the intercooler is placed rearward of the air compressor and is opposed to the refrigerant supply pump with the air compressor interposed therebetween,
   a first portion of the air compressor is positioned between the refrigerant supply pump and the intercooler in the forward/rearward direction,
   a second portion of the air compressor is positioned on one side in a widthwise direction of the fuel cell vehicle, to more than an extent to which the refrigerant supply pump and the intercooler are positioned on the one side, and
   the air compressor is placed such that the first portion is inclined rearward of the second portion in the forward/rearward direction.

2. The fuel cell vehicle in accordance with claim 1, further comprising:
   an anode offgas circulation pump placed below the fuel cell and rearward of the air compressor in the forward/rearward direction in the front room, the anode offgas circulation pump being configured to circulate anode offgas to the fuel cell; and
   a tank placed below the vehicle compartment and filled with anode gas to be supplied to the fuel cell, wherein
   at least a rear side portion of the anode offgas circulation pump is placed at such a position as not to overlap with the tank as the fuel cell vehicle is viewed from the forward side.

3. The fuel cell vehicle in accordance with claim 1, wherein
   the air compressor is configured so as to allow a higher voltage to be applied thereto than applied to the refrigerant supply pump.

4. A fuel cell vehicle having a vehicle compartment, and a front room positioned forward of the vehicle compartment, the fuel cell vehicle comprising:
   a fuel cell placed in the front room;

an air compressor placed below the fuel cell in the front room to supply the fuel cell with cathode gas; and a refrigerant supply pump placed below the fuel cell in the front room to supply the fuel cell with a refrigerant, wherein when the fuel cell vehicle is viewed from a forward side in a forward/rearward direction of the fuel cell vehicle, the refrigerant supply pump is placed forward of the air compressor in the forward/rearward direction of the fuel cell vehicle such that at least part of the refrigerant supply pump overlaps with the air compressor, the air compressor includes a first portion positioned rearward of the refrigerant supply pump in the forward/rearward direction, and a second portion positioned on one side in a widthwise direction of the fuel cell vehicle, to more than an extent to which the refrigerant supply pump is positioned on the one side, and the air compressor is placed such that the first portion is inclined rearward of the second portion in the forward/rearward direction.

* * * * *